US012129690B2

(12) United States Patent
Nam et al.

(10) Patent No.: US 12,129,690 B2
(45) Date of Patent: Oct. 29, 2024

(54) ELECTRIC DOOR LATCH APPARATUS FOR VEHICLE

(71) Applicants: Hyundai Motor Company, Seoul (KR); Kia Corporation, Seoul (KR)

(72) Inventors: Jinwoo Nam, Seoul (KR); Jungho Han, Seoul (KR); Kyoung Taek Kwak, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 208 days.

(21) Appl. No.: 17/892,272

(22) Filed: Aug. 22, 2022

(65) Prior Publication Data

US 2023/0228132 A1 Jul. 20, 2023

(30) Foreign Application Priority Data

Jan. 14, 2022 (KR) ........................ 10-2022-0005738

(51) Int. Cl.
*E05B 81/90* (2014.01)
*E05B 77/30* (2014.01)
(Continued)

(52) U.S. Cl.
CPC .............. *E05B 81/90* (2013.01); *E05B 77/30* (2013.01); *E05B 81/06* (2013.01); *E05B 81/14* (2013.01);
(Continued)

(58) Field of Classification Search
CPC .......... E05B 81/00; E05B 81/02; E05B 81/06; E05B 81/12; E05B 81/13; E05B 81/14; E05B 81/24; E05B 81/26; E05B 81/30; E05B 81/32; E05B 81/34; E05B 81/54; E05B 81/56; E05B 81/58; E05B 81/60; E05B 81/62; E05B 81/72; E05B 81/74; E05B 81/76; E05B 81/90; E05B 77/00;
(Continued)

(56) References Cited

U.S. PATENT DOCUMENTS 8,474,888 B2 * 7/2013 Tomaszewski ......... E05B 77/30
292/216
10,472,865 B2 * 11/2019 Vazquez ................. E05B 81/36
(Continued)

FOREIGN PATENT DOCUMENTS

KR 20200107082 A 9/2020
KR 20210090451 A 7/2021

*Primary Examiner* — Nathan Cumar
(74) *Attorney, Agent, or Firm* — Slater Matsil, LLP

(57) ABSTRACT

An electric door latch apparatus includes a catch part for unlocking a door to a vehicle body by being caught by a striker mounted on the vehicle body or selectively unlocking the door from the vehicle body by being separated from the striker, a door locking/unlocking part for unlocking or locking the catch part to the striker by applying a rotational force of a main motor to the catch part, a master lock link for selectively rotating the catch part, a key lever for selectively restricting a rotation of the master lock link, an inside emergency operating lever rotatable by an inside handle for selectively rotating the master lock link, a manual emergency door unlocking part movable by a rotation of the inside emergency operating lever for selectively providing an elastic force to the key lever, and an electric emergency door unlocking part for selectively moving the key lever.

20 Claims, 17 Drawing Sheets

(51) Int. Cl.

| | |
|---|---|
| ***E05B 81/06*** | (2014.01) |
| ***E05B 81/14*** | (2014.01) |
| ***E05B 81/30*** | (2014.01) |
| ***E05B 81/34*** | (2014.01) |
| ***E05B 81/56*** | (2014.01) |
| ***E05B 81/76*** | (2014.01) |
| ***E05B 85/24*** | (2014.01) |
| ***E05B 85/26*** | (2014.01) |

(52) U.S. Cl.
CPC .............. *E05B 81/30* (2013.01); *E05B 81/34* (2013.01); *E05B 81/56* (2013.01); *E05B 81/76* (2013.01); *E05B 85/243* (2013.01); *E05B 85/26* (2013.01)

(58) Field of Classification Search
CPC .......... E05B 77/22; E05B 77/30; E05B 85/00; E05B 85/20; E05B 85/24; E05B 85/243; E05B 85/26
USPC .......................................................... 70/279.1
See application file for complete search history.

(56) References Cited

U.S. PATENT DOCUMENTS

| | | | | |
|---|---|---|---|---|
| 2016/0362916 | A1* | 12/2016 | Tomaszewski | E05B 81/06 |
| 2018/0023325 | A1* | 1/2018 | Takagi | E05B 81/16<br>292/259 A |
| 2020/0095809 | A1* | 3/2020 | Yong | E05B 81/06 |
| 2020/0284069 | A1* | 9/2020 | Nam | B60J 5/04 |
| 2020/0332570 | A1* | 10/2020 | Tomaszewski | E05B 81/34 |
| 2020/0347649 | A1* | 11/2020 | Nam | E05B 79/08 |
| 2021/0214975 | A1 | 7/2021 | Nam et al. | |

* cited by examiner

ELECTRIC DOOR LATCH APPARATUS FOR VEHICLE

CROSS-REFERENCE TO RELATED APPLICATIONS

This application claims the benefit of Korean Patent Application No. 10-2022-0005738, filed on Jan. 14, 2022, which application is hereby incorporated herein by reference.

TECHNICAL FIELD

The present invention relates to an electric door latch apparatus for a vehicle.

BACKGROUND

In general, a vehicle door is equipped with a door latch apparatus. A process of opening or closing a door and a process of locking or unlocking the door are performed by operations of an inside handle and a safety knob positioned inside the door, an operation of an outside handle positioned outside the door, or an operation of a key.

Additionally, in the case of a vehicle to which a personal identification card (PIC) system, called a smart key, is applied, the driver may unlock the door as the personal identification process is completed even though the driver only has the smart key (smart card or fob).

Recently, an electric door latch (E-door latch) apparatus configured to operate by using an electric force has been applied, instead of a mechanical door latch apparatus in the related art that operates by means of mechanical structures.

Because the electric door latch apparatus uses electrical driving power of a motor, the electric door latch apparatus implements high-grade operation characteristics in comparison with the mechanical door latch apparatus.

Therefore, like the vehicle to which the mechanical door latch apparatus in the related art is applied, the driver may pull an outside handle and open the door immediately after the personal identification through the smart key or the like is completed in the vehicle to which the electric door latch apparatus is applied.

However, power needs to be supplied to operate the electric door latch apparatus. Therefore, when a battery of the vehicle is discharged or when a power cable or the like from the battery to the door latch apparatus is disconnected because of deformation of the door in the event of a broadside collision, an operation of releasing a door lock cannot be performed. As a result, the user cannot open the door even though the user manipulates the outside handle.

If the user cannot open the door, the user cannot perform an operation of replacing the battery of the vehicle by opening a hood or an operation of connecting the battery of the vehicle to a battery of another vehicle to restart the vehicle. In particular, because the user cannot open the door in an emergency situation such as an accident, the user cannot perform a subsequent measure.

In some instances, a separate additional battery is installed in the vehicle to prevent the situation in which the user cannot open the door. However, the installation of the additional battery may increase the weight and cost of the vehicle. Further, the natural discharge time of the additional battery increases because a supply of power of the vehicle is cut off. For this reason, there may be a situation in which power cannot be supplied to the electric door latch apparatus.

Meanwhile, a separate child-lock device is provided in the door of the vehicle and electrically operates to prevent the door from being unlocked when an occupant such as a child seated in a rear seat accidentally manipulates an inside handle. The child-lock device is implemented by using a motor or a link separately from the electric door latch apparatus, which increases the number of components of the vehicle and the weight and cost of the vehicle. In addition, when the occupant in the vehicle repeatedly uses the child-lock device, an electric motor for performing the child-lock function may be overloaded.

In addition, a deadlock device is installed in the door to prevent vehicle theft by preventing the door locked to the vehicle body from being forcibly opened from the inside or outside of the vehicle without the use of a vehicle key or a remote controller. The deadlock device is also implemented by using a motor or a link separately from the electric door latch apparatus, which increases the number of components of the vehicle and the weight and cost of the vehicle.

Accordingly, there is a need for research and development of a more compact electric door latch apparatus having a structure for appropriately releasing the locked door by using a locked door releasing means even in a case in which the motor cannot operate because of a collision accident of the vehicle or a discharge of the battery. Further, there is a need for research and development of the electric door latch apparatus in which the above-mentioned structure is integrated with the above-mentioned functions of the electric door latch apparatus, the child-lock function, and the deadlock function.

The above information disclosed in this background section is only for enhancement of understanding of the background of embodiments of the invention, and therefore it may contain information that does not form the prior art that is already known to a person of ordinary skill in the art.

SUMMARY

The present invention relates to an electric door latch apparatus for a vehicle. Particular embodiments relate to an electric door latch apparatus for a vehicle that is capable of implementing, in an integrated manner, a function of locking or unlocking a door to or from a vehicle body, a function of releasing the door locked to the vehicle body in the event of an emergency, a child-lock function of implementing a safety operation of an inside handle installed on the door to allow a user to manually release the locked door, and a deadlock function of preventing the door locked to the vehicle body from being forcibly released from the inside or outside of the vehicle without use of a vehicle key or a remote controller.

Embodiments of the present invention can provide an electric door latch apparatus for a vehicle that is capable of implementing all of an electric door latch function, an emergency door release function, a child-lock function, and a deadlock function with a single configuration, thereby implementing a compact and smart door for a vehicle.

Embodiments of the present invention can provide an electric door latch apparatus for a vehicle that is capable of preventing an overload of a motor caused by the repetitive use of a child-lock device or a deadlock device.

An exemplary embodiment of the present invention provides an electric door latch apparatus for a vehicle, the electric door latch apparatus including a catch part configured to lock a door to a vehicle body by being caught by a striker mounted on the vehicle body or to selectively unlock the door from the vehicle body by being separated from the striker, a door locking/unlocking part configured to unlock or lock the catch part to the striker by applying a rotational force of a main motor to the catch part, a master lock link configured to selectively rotate the catch part, a key lever configured to selectively restrict a rotation of the master lock link, an inside emergency operating lever configured to be rotated by an inside handle and to selectively rotate the master lock link, a manual emergency door unlocking part configured to be moved by a rotation of the inside emergency operating lever and to selectively provide an elastic force to the key lever, and an electric emergency door unlocking part configured to selectively move the key lever.

The catch part may include a catch having a locking groove formed so that the striker is inserted into the locking groove or the striker is separated from the locking groove, a pawl rotatably provided in a state of being in close contact with the catch and configured to restrict a rotation of the catch or to be separated from the catch to allow the catch to rotate freely, and a pawl release lever configured to rotate integrally with the pawl.

A hook formed on the master lock link may be selectively caught by a seating protrusion formed on the pawl release lever, such that the catch part is selectively rotated.

A pressing flange formed on the inside emergency operating lever may selectively press a rotation guide flange formed on the master lock link by a rotation of the inside emergency operating lever.

A push flange formed on the inside emergency operating lever may push up a first connection protrusion formed on the key lever by a rotation of the inside emergency operating lever, such that the key lever moves.

An emergency protrusion may be formed on the key lever, a main slot may be formed in the manual emergency door unlocking part, an auxiliary slot may be formed adjacent to the main slot of the manual emergency door unlocking part, and the emergency protrusion may be inserted into the main slot, such that an elastic force is applied to the key lever.

The main slot may include upper and lower regions each having a large width and a central region disposed between the upper region and the lower region and having a width smaller than the width of the upper region and the width of the lower region.

A rib formed between the central region and the auxiliary slot may apply an elastic force to the emergency protrusion of the key lever.

The electric emergency door unlocking part may include a sub-motor, a sub-driving gear provided on a rotary shaft of the sub-motor, a sub-driven gear configured to engage with the sub-driving gear, and a rotary protrusion formed on the sub-driven gear and inserted into a position regulating groove formed in the key lever.

The electric emergency door latch apparatus for a vehicle according to an exemplary embodiment of the present invention may further include a child-lock switch provided in the vehicle, an inside handle detection sensor configured to detect a motion of the inside handle, and a controller configured to operate the sub-motor and move the key lever when the child-lock switch is turned on and the inside handle detection sensor detects the motion of the inside handle.

The electric emergency door latch apparatus for a vehicle according to an exemplary embodiment of the present invention may further include a parking switch provided in the vehicle, a deadlock switch provided in the vehicle, an inside handle detection sensor configured to detect a motion of the inside handle, and a controller configured to operate the sub-motor and move the key lever when the parking switch and the deadlock switch are turned on and the inside handle detection sensor detects the motion of the inside handle.

The door locking/unlocking part may include the main motor, a rotary shaft provided on the main motor and configured to rotate in two directions, a main driving gear provided on the rotary shaft, a main driven gear configured to engage with the main driving gear, and a main operating lever configured to engage with the main driven gear and transmit a rotational force of the main motor to the pawl release lever through the main driven gear.

A pressing protrusion may be formed on the main operating lever, a seating protrusion corresponding to the pressing protrusion may be formed on the pawl release lever, and the pressing protrusion may press the seating protrusion by a rotation of the main operating lever, such that the pawl release lever rotates.

The electric emergency door latch apparatus for a vehicle according to an exemplary embodiment of the present invention may further include a key nut configured to move the key lever by being rotated by a vehicle key.

First and second operating protrusions may be formed on the key nut and selectively connected to a catching end formed on the key lever.

The electric emergency door latch apparatus for a vehicle according to an exemplary embodiment of the present invention may further include an outside emergency operating lever configured to be rotated by an operating force of an outside handle and to apply a rotational force to the catch part through the electric emergency door unlocking part.

A first long hole may be formed in the outside emergency operating lever, a pin shaft may be formed on the master lock link, and the pin shaft may be movably inserted into the first long hole.

According to the electric door latch apparatus for a vehicle according to an embodiment of the present invention described above, the rotation of the master lock link is restricted by the key lever even though the occupant repeatedly manipulates the inside handle in the state in which the child-lock switch or the deadlock switch is turned on. Therefore, it is possible to maintain the state in which the door is locked to the vehicle body.

Therefore, it is possible to prevent an overload caused by the repeated operation of the motor and stably perform the child-lock function or the deadlock function.

BRIEF DESCRIPTION OF THE DRAWINGS

Because the drawings are provided for reference to describe exemplary embodiments of the present invention, the technical spirit of the present invention should not be construed as being limited to the accompanying drawings.

Figure 1:
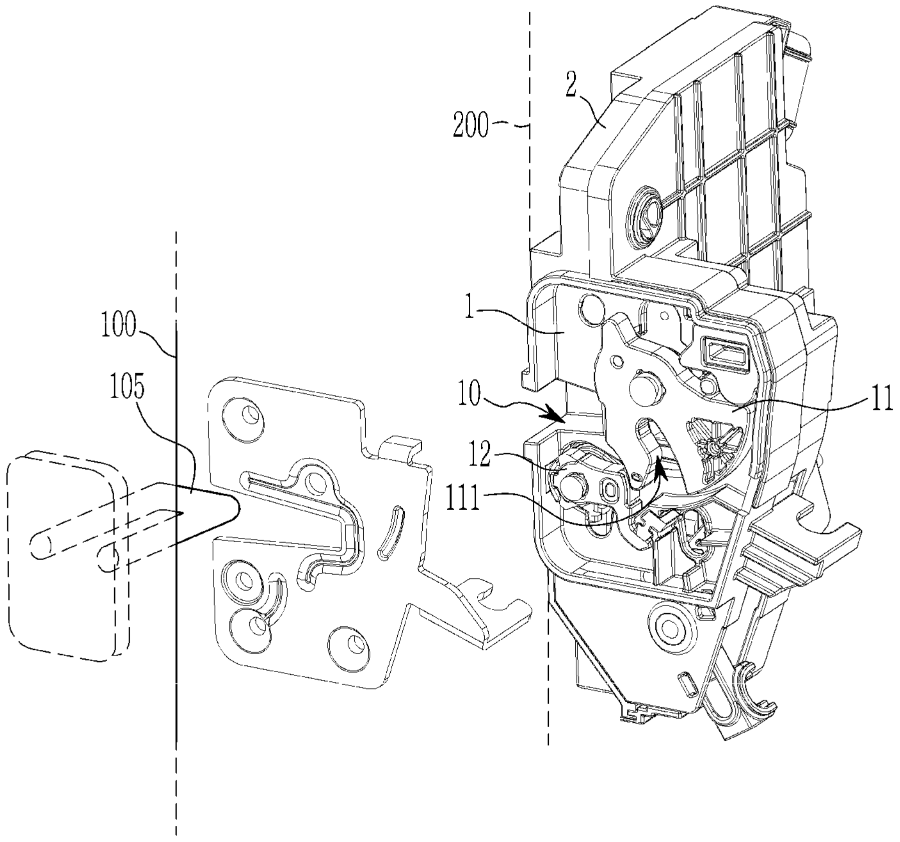
FIG. 1 is a perspective view illustrating one side of an electric door latch apparatus for a vehicle according to an embodiment of the present invention.

The following reference identifiers may be used in connection with the accompanying drawings to describe exemplary embodiments of the present disclosure.

1: First base plate
2: Second base plate
10: Catch part
11: Catch
111: Locking groove
12: Pawl
13: Pawl release lever
131: Seating protrusion
20: Door locking/unlocking part
21: Main motor
211: Main driving gear
22: Main driven gear
23: Operating lever
231: Pressing protrusion
30: Electric emergency door unlocking part
31: Sub-motor
311: Sub-driving gear
32: Sub-driven gear
321: Rotary protrusion
33: Master lock link
331: Hook
332: Rotation guide flange
333: Pin shaft
335: Stop protrusion
34: Pressing spring
40: Inside emergency operating lever
41: Inside handle wire
42: Pressing flange
43: Push flange
45: Return spring
50: Outside emergency operating lever
51: Outside handle wire
52: First long hole
53: Wire groove
60: Key nut
61: First operating protrusion
62: Second operating protrusion
63: Movable groove
70: Key lever
70-1: First portion
70-2: Second portion
71: Second long hole
72: Catching end
73: Position regulating groove
75: Catching projection
77: Mounting protrusion
79: Emergency protrusion
80: Manual emergency door unlocking part
81: First connection protrusion
82: Second connection protrusion
85: Main slot
85-1: Upper region
85-2: Lower region
85-3: Central region
86: Auxiliary slot
87: Rib
90: Parking switch
92: Child-lock switch
94: Deadlock switch
96: Inside handle detection sensor

DETAILED DESCRIPTION OF ILLUSTRATIVE EMBODIMENTS

Embodiments of the present invention will be described in detail with reference to the accompanying drawings so that those with ordinary skill in the art to which the present invention pertains may easily carry out the embodiments. However, the present invention may be implemented in various different ways and is not limited to the embodiments described herein.

A part irrelevant to the description will be omitted to clearly describe embodiments of the present invention, and the same or similar constituent elements will be designated by the same reference numerals throughout the specification.

In addition, the size and thickness of each component illustrated in the drawings are arbitrarily shown for ease of description, but the present invention is not limited thereto. In order to clearly describe several portions and regions, thicknesses thereof are enlarged.

Throughout the specification, unless explicitly described to the contrary, the word “comprise/include” and variations such as “comprises/includes” or “comprising/including” will be understood to imply the inclusion of stated elements, not the exclusion of any other elements.

Hereinafter, an electric door latch apparatus for a vehicle according to embodiments of the present invention will be described in detail with reference to the accompanying drawings.

Figure 2:
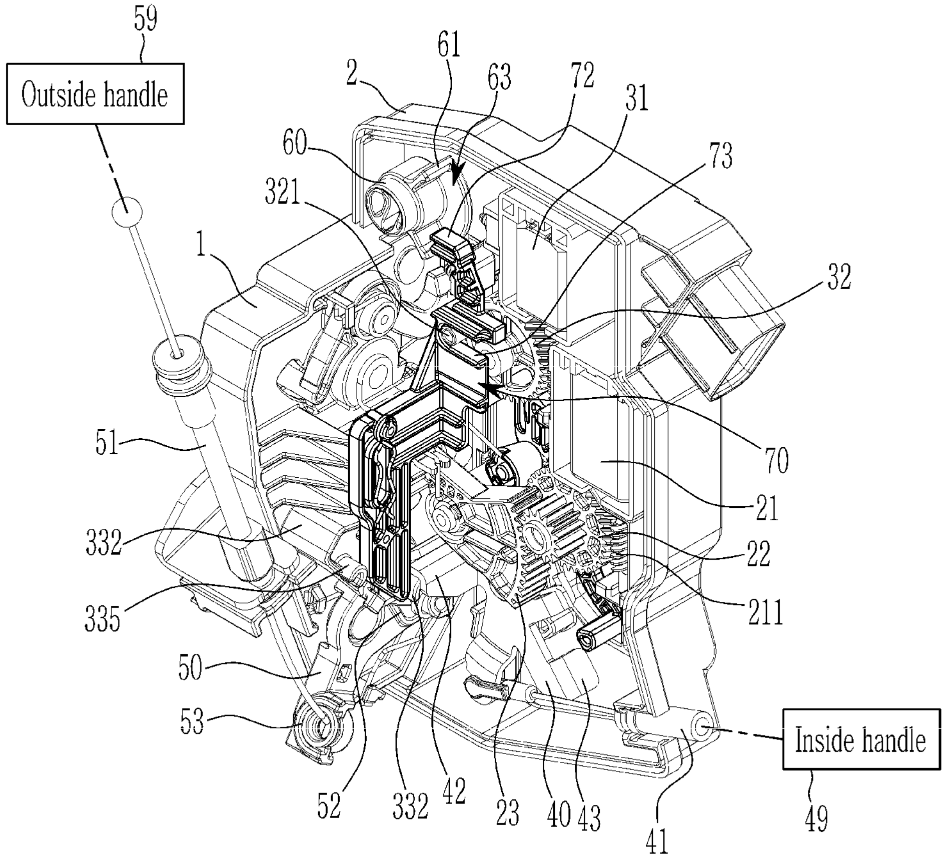
FIG. 2 is a perspective view illustrating the other side of the electric door latch apparatus for a vehicle according to an embodiment of the present invention.
Figure 3:
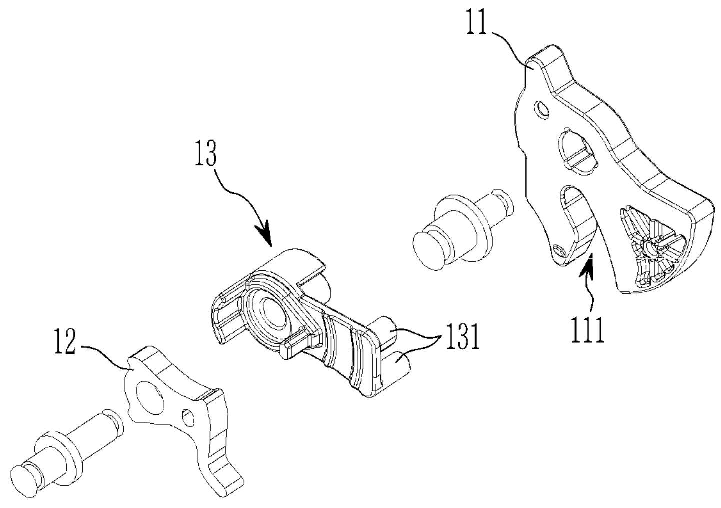
FIG. 3 is an exploded perspective view of a catch part applied to the electric door latch apparatus for a vehicle according to an embodiment of the present invention.
Figure 4:
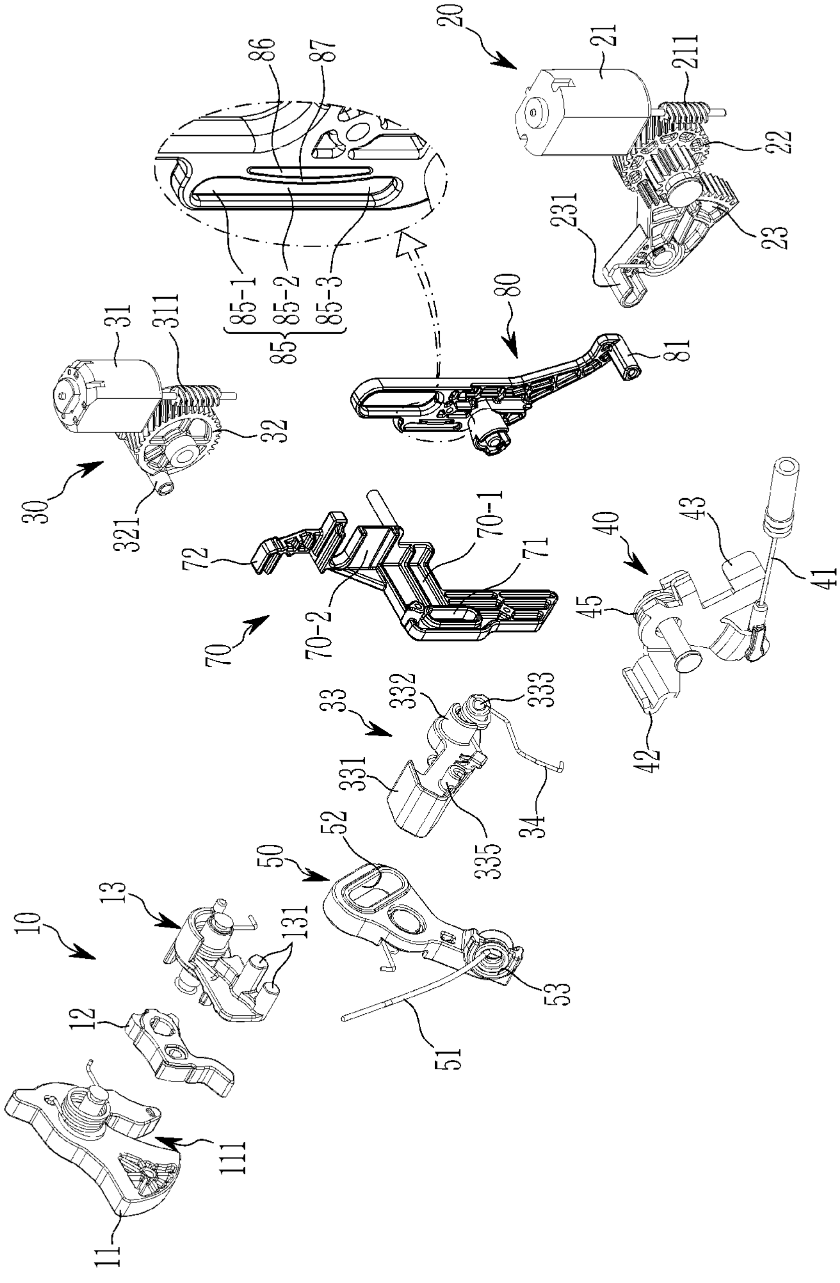
FIG. 4 is an exploded perspective view illustrating a door locking/unlocking part and electric and manual emergency door unlocking parts applied to the electric door latch apparatus for a vehicle according to an embodiment of the present invention.

FIG. 1 is a perspective view illustrating one side of an electric door latch apparatus for a vehicle according to an embodiment of the present invention, FIG. 2 is a perspective view illustrating the other side of the electric door latch apparatus for a vehicle according to an embodiment of the present invention, FIG. 3 is an exploded perspective view of a catch part applied to the electric door latch apparatus for a vehicle according to an embodiment of the present invention, and FIG. 4 is an exploded perspective view illustrating a door locking/unlocking part and electric and manual emergency door unlocking pails applied to the electric door latch apparatus for a vehicle according to an embodiment of the present invention.

Referring to FIGS. 1 and 2, an electric door latch apparatus for a vehicle according to an embodiment of the present invention includes a first base plate 1, a second base plate 2, and various types of components mounted on the first and second base plates 1 and 2. The first base plate 1 and the second base plate 2 may be disposed to be perpendicular to each other.

The electric door latch apparatus for a vehicle is mounted on a door 200 of a vehicle by means of the first base plate 1 and the second base plate 2 and configured to lock or unlock the door 200 to or from a vehicle body 100.

The electric door latch apparatus for a vehicle locks or unlocks the door 200 to or from the vehicle body 100 by fastening or releasing a catch 11, which is provided on the door 200, to or from a striker 105 mounted on the vehicle body 100.

The electric door latch apparatus for a vehicle may include a catch part 10, a door locking/unlocking part 20, an electric emergency door unlocking part 30, an inside emergency operation lever 40, an outside emergency operation lever 50, and a manual emergency door unlocking part 80.

The catch part 10 may lock the door 200 to the vehicle body 100 by being caught by the striker 105 mounted on the vehicle body 100. Alternatively, the catch part 10 may selectively unlock the door 200 from the vehicle body 100 by being separated from the striker 105. The door locking/unlocking pall 20 locks or unlocks the catch part 10 to or from the striker 105 by applying a rotational force to the catch part 10 by using a main motor 21. The emergency door locking/unlocking part 80 releases the door 200, which is locked to the vehicle body 100, from the vehicle body wo when the door locking/unlocking part 20 cannot operate because of an electric discharge, a collision accident, or the like.

Catch Part

Referring to FIG. 3, the catch part 10 is rotatably mounted on the first base plate 1.

The catch part 10 may include the catch 11 having a locking groove 111 so that the striker 105 mounted on the vehicle body 100 is inserted into or separated from the locking groove 111, a pawl 12 rotatably mounted on the first base plate 1 so as to be in close contact with the catch 11, and a pawl release lever 13 disposed between the pawl 12 and the first base plate 1 and mounted integrally and rotatably on the pawl 12.

That is, the catch 11 is rotatably mounted on the first base plate 1 and has the locking groove 111 so that the striker 105 is inserted into and caught by or separated from the locking groove 111.

The pawl 12 is rotatably mounted on the first base plate 1 in a state in which the pawl 12 is in close contact with the catch 11. The pawl 12 may block the rotation of the catch 11 or be separated from the catch 11 to allow the catch to rotate freely.

In this case, the pawl 12 is rotated within a rotation trajectory of the catch 11, such that the pawl 12 may block the rotation of the catch 11 or rotate to deviate from the rotation trajectory of the catch 11 so as to allow the catch 11 to rotate freely.

Door Locking/Unlocking Part

Referring to FIG. 4, the door locking/unlocking part 20 may include the main motor 21 mounted on the second base plate 2, a main driven gear 22 configured to engage with the main motor 21, and a main operating lever 23 configured to engage with the main driven gear 22 and to rotate the pawl release lever 13 by using a rotational force of the main motor 21 through the main driven gear 22.

A main driving gear 211 is provided on a rotary shaft of the main motor 21 that may rotate in two directions. The main driven gear 22 engages with the main driving gear 211. Various types of electric motors may be used as the main motor 21.

The main operating lever 23 engages with the main driven gear 22 in the state in which the main operating lever 23 is mounted on the second base plate 2. The main operating lever 23 rotates the pawl release lever 13 while rotating by receiving the rotational force through the main driven gear 22.

A pressing protrusion 231 is formed on the main operating lever 23 and two seating protrusions 131 are formed on the pawl release lever 13. In an embodiment of the present invention, the two seating protrusions 131 may be respectively positioned at a radially inner side and a radially outer side of a rotary shaft of the pawl release lever 13. In this case, the seating protrusion 131 positioned at the radially inner side of the pawl release lever 13 is formed at a position corresponding to the pressing protrusion 231 of the main operating lever 23.

When the main operating lever 23 rotates, the pressing protrusion 231 rotates the pawl release lever 13 by pressing the seating protrusion 131 positioned at the radially inner side of the pawl release lever 13.

Electric Emergency Door Unlocking Part

The electric emergency door unlocking pall 30 may selectively move a key lever 70 by using power.

The electric emergency door unlocking pall 30 includes a sub-motor 31 mounted on the second base plate 2, a sub-driven gear 32 configured to engage with the sub-motor 31, a master lock link 33 rotatably mounted on the first base plate 1, and a pressing spring 34 configured to press the master lock link 33 to rotate the master lock link 33 clockwise.

The sub-motor 31 is disposed at a position adjacent to the main motor 21. A sub-driving gear 311 is provided on a rotary shaft of the sub-motor 31 that may rotate in two directions. The sub-driven gear 32 engages with the sub-driving gear 311. Various types of electric motors may be used as the sub-motor 31.

A rotary protrusion 321 is integrated with the sub-driven gear 32 that engages with the sub-motor 31.

The rotary protrusion 321 of the sub-driven gear 32 is disposed to correspond to a position regulating groove 73 of the key lever 70 that will be described below. The rotary protrusion 321 regulates a position of the key lever 70 in an upward/downward direction while being moved on the position regulating groove 73 by a rotation of the sub-driven gear 32.

In addition, the master lock link 33 is rotatably mounted on the first base plate 1 and has a hook 331 formed at an end thereof. The hook 331 is caught by the seating protrusions 131 of the pawl release lever 13 when the master lock link 33 rotates.

The master lock link 33 has a stop protrusion 335 formed at a position adjacent to the hook 331. A rotation angle of the master lock link 33 may be regulated by the stop protrusion 335 and the key lever 70. That is, the rotation of the catch part 10 is selectively restricted by the rotation of the master lock link 33.

Inside Emergency Operating Lever

The inside emergency operating lever 40 may be rotated by an operation of an inside handle 49 and may selectively rotate the master lock link 33.

As illustrated in the drawings, the inside emergency operating lever 40 is rotatably mounted on the second base plate 2. One radial end of the inside emergency operating lever 40 is connected to the master lock link 33 through a pressing flange 42. The other radial end of the inside emergency operating lever 40 is connected to the manual emergency door unlocking part 80 through a push flange 43. One radial end of the inside emergency operating lever 40, between one radial end and the other end of the inside emergency operating lever 40, is connected to the inside handle 49 through an inside handle wire 41.

In addition, a return spring 45 is mounted on the inside emergency operating lever 40 and serves to return the inside emergency operating lever 40 back to an original position. The return spring 45 may be mounted on a rotary shaft mounted on the second base plate 2.

Outside Emergency Operating Lever

Further, as illustrated, the outside emergency operating lever 50 is rotatably mounted on the first base plate 1. A wire groove 53 is formed at one end of the outside emergency operating lever 50, and an outside handle wire 51 connected to an outside handle 59 is connected to the wire groove 53. A first long hole 52 is formed at the other end of the outside emergency operating lever 50, and a pin shaft 333 of the master lock link 33 is inserted into the first long hole 52.

The outside emergency operating lever 50 is connected to the master lock link 33 through the pin shaft 333. When the outside handle 59 operates, the master lock link 33 may rotate while moving in the first long hole 52.

Manual Emergency Door Unlocking Part

The manual emergency door unlocking part 80 may be moved by the rotation of the inside emergency operating lever 40 and may selectively provide an elastic force (or compressive force) to the key lever 70.

One end of the manual emergency door unlocking part 80 is connected to the push flange 43 of the inside emergency operating lever 40.

A first connection protrusion 81 is formed on the manual emergency door unlocking part 80 and protrudes to correspond to the push flange 43 of the inside emergency operating lever 40. The first connection protrusion 81 is rotated by the operation of the inside emergency operating lever 40.

When the inside emergency operating lever 40 operates, the manual emergency door unlocking part 80 moves upward while engaging with the push flange 43 through the first connection protrusion 81.

For example, when the user pulls the inside handle 49, the inside emergency operating lever 40 is rotated counterclockwise based on the drawings by the inside handle wire 41. When the inside emergency operating lever 40 rotates counterclockwise, the push flange 43 of the inside emergency operating lever 40 pushes up the first connection protrusion 81 of the manual emergency door unlocking part 80. Therefore, the manual emergency door unlocking part 80 moves upward.

The manual emergency door unlocking part 80 has a main slot 85 and an auxiliary slot 86 that selectively provide an elastic force (or compressive force) to an emergency protrusion 79 of the key lever 70 that will be described below. Further, a rib 87 is formed between the main slot 85 and the auxiliary slot 86.

The main slot 85 includes upper and lower regions 85-1 and 85-2 each having a relatively large width, and a central region 85-3 disposed between the upper region 85-1 and the lower region 85-2 and having a relatively small width. The width of each of the upper and lower regions 85-1 and 85-2 corresponds to or is larger than a width (or diameter) of the emergency protrusion 79. The width of the central region 85-3 is smaller than the width (or diameter) of the emergency protrusion 79. The auxiliary slot 86 is formed at a position adjacent to the central region 85-3. Therefore, an elastic force (or compressive force) may be applied to the emergency protrusion 79 by the rib 87 formed between the main slot 85 and the auxiliary slot 86.

Key Lever

The key lever 70 may selectively restrict the rotation of the master lock link 33. To this end, the key lever 70 may be selectively connected to the master lock link 33.

The key lever 70 includes a first portion 70-1 parallel to the first base plate 1 and a second portion 70-2 parallel to the second base plate 2. The first portion 70-1 and the second portion 70-2 are formed to be perpendicular to each other.

The first portion 70-1 has a second long hole 71. A mounting protrusion 77 formed on the first base plate 1 is inserted into the second long hole 71 and guides the movement of the key lever 70.

An upper end of the key lever 70 is selectively connected to a key nut 60 into which a vehicle key may be inserted and rotated. A lower end of the first portion 70-1 of the key lever 70 is selectively connected to the master lock link 33.

The position regulating groove 73 is formed in the second portion 70-2 of the key lever 70, and the rotary protrusion 321 of the sub-driven gear 32 is inserted into the position regulating groove 73 of the key lever 70. When the sub-driven gear 32 rotates, the key lever 70 is moved in an upward/downward direction by the rotary protrusion 321 of the sub-driven gear inserted into the position regulating groove 73 of the key lever 70. That is, an operating position of the key lever 70 is regulated by the rotary protrusion 321 that is inserted into the position regulating groove 73 and rotated.

The emergency protrusion 79 is formed on the second portion 70-2 of the key lever 70 and inserted into the main slot 85. The emergency protrusion 79 may be formed in a cylindrical shape.

The key nut 60 has two operating protrusions spaced apart from each other in a circumferential direction, i.e., a first operating protrusion 61 and a second operating protrusion 62. The first operating protrusion 61 and the second operating protrusion 62 are selectively connected to a catching end 72 of the key lever 70.

A movable groove 63 is formed between the first operating protrusion 61 and the second operating protrusion 62, and the catching end 72 of the key lever 70 is movably inserted into the movable groove 63.

Controller

Meanwhile, the electric door latch apparatus for a vehicle according to an embodiment of the present invention may include a child-lock switch 92, a parking switch 90, an inside handle detection sensor 96, a deadlock switch 94, and a controller C.

The child-lock switch 92 is provided in the vehicle. An operating signal of the child-lock switch 92 is transmitted to the controller.

The parking switch 90 is provided in the vehicle. The parking switch 90 detects a parked state of the vehicle and transmits the parked state to the controller.

The inside handle detection sensor 96 detects a motion of the inside handle and transmits the motion of the inside handle to the controller.

The deadlock switch 94 is provided in the vehicle. An operating signal of the deadlock switch 94 is transmitted to the controller.

The controller controls an operation of the main motor 21 and an operation of the sub-motor 31. To this end, the controller includes one or more processors configured to be operated by a preset program. The preset program performs respective steps of a method of controlling the electric emergency door latch apparatus for a vehicle according to an embodiment of the present invention.

Hereinafter, the operations of the electric door latch apparatus for a vehicle according to an embodiment of the present invention for respective situations will be described.

In some instances, the electric door latch apparatus for a vehicle according to an embodiment of the present invention may implement a 2-motion override operation mechanism in which the inside handle 49 or the outside handle 59 operates once to release the locked state of the door 200 (primary motion), and the inside handle 49 or the outside handle 59 operates once more continuously to release the locked state of the catch 11 from the striker 105 of the vehicle body 100 (secondary motion).

Figure 5:
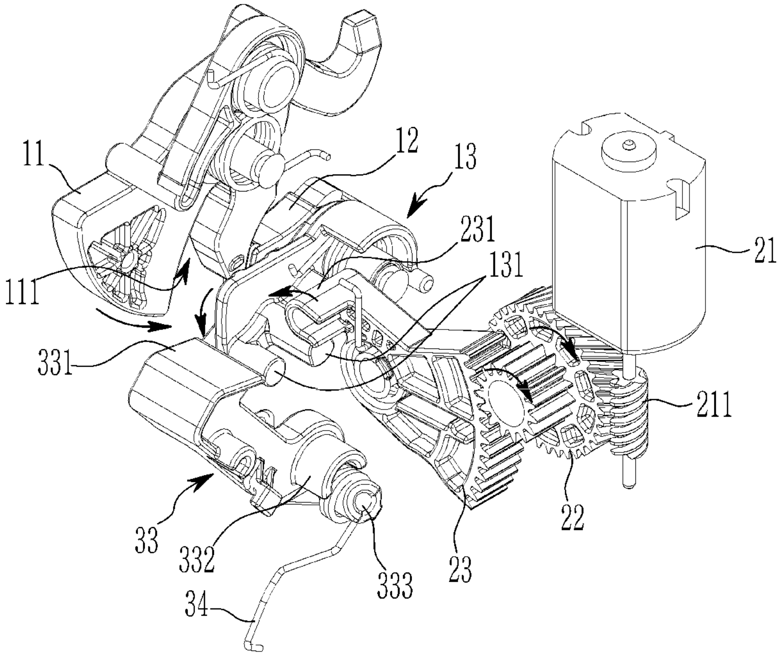
FIG. 5 is a view for explaining an operation of the door locking/unlocking part of a door latch applied to the electric door latch apparatus for a vehicle according to an embodiment of the present invention.

FIG. 5 is a view for explaining an operation of the door locking/unlocking part of the door latch applied to the electric door latch apparatus for a vehicle according to an embodiment of the present invention.

FIG. 5 is a view for explaining a general operation of opening the door.

When the user operates an inside button switch or an outside button switch installed on the door 200 to open the door 200, the controller C (see FIG. 14) detects the operation of the inside button switch or the outside button switch and applies an operational signal to the main motor 21 to operate the main motor 21.

Referring to FIG. 5, the main driving gear 211 and the main driven gear 22 are rotated by the operation of the main motor 21, and the main operating lever 23 engaging with the main driven gear 22 pushes and rotates the pawl release lever 13 while rotating. The pawl 12 is rotated by the rotation of the pawl release lever 13 and separated from the rotation trajectory of the catch 11 to allow the catch 11 to rotate freely, such that the door 200 locked to the vehicle body may be unlocked and opened.

In this case, when the user grasps the inside handle 49 or the outside handle 59 installed on the door 200 and pushes or pulls the door 200, the door 200 is rotated and opened in the state in which one side of the door 200 is supported on the vehicle body 100.

Figure 6:
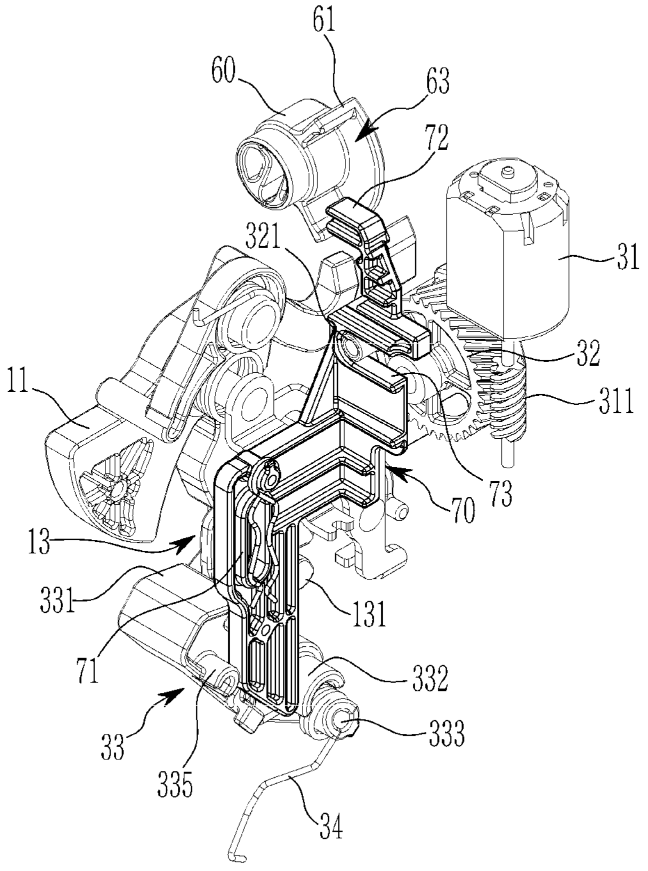
FIG. 6 is a view for explaining an operation of the electric emergency door unlocking part applied to the electric door latch apparatus for a vehicle according to an embodiment of the present invention.
Figure 7:
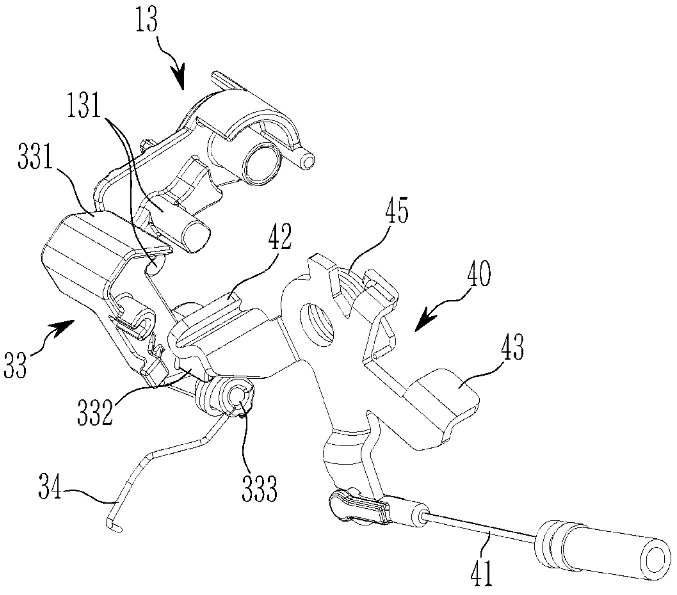
FIG. 7 is a view for explaining operations of an inside emergency operation lever and a master lock link applied to the electric door latch apparatus for a vehicle according to an embodiment of the present invention.
Figure 8:
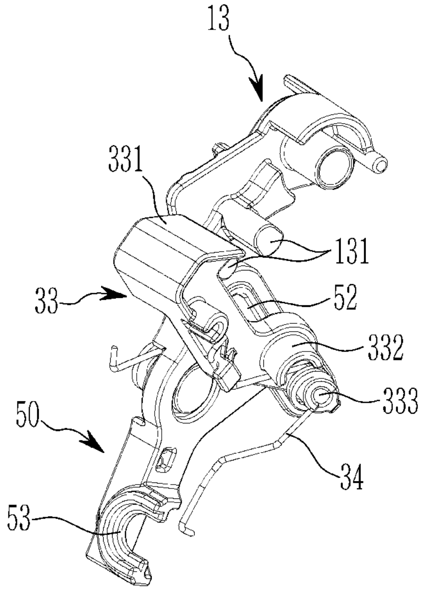
FIG. 8 is a view for explaining operations of an outside emergency operation lever and the master lock link applied to the electric door latch apparatus for a vehicle according to an embodiment of the present invention.

FIG. 6 is a view for explaining an operation of the electric emergency door unlocking part applied to the electric door latch apparatus for a vehicle according to an embodiment of the present invention, FIG. 7 is a view for explaining operations of an inside emergency operation lever and a master lock link applied to the electric door latch apparatus for a vehicle according to an embodiment of the present invention, and FIG. 8 is a view for explaining operations of an outside emergency operation lever and the master lock link applied to the electric door latch apparatus for a vehicle according to an embodiment of the present invention.

FIGS. 6 to 8 are views for explaining a process of opening the door when the main motor is broken down.

When the main motor 21 cannot operate because of a collision accident of the vehicle, the controller C detects a collision by means of a collision detection sensor, applies an operational signal to the sub-motor 31, and operates the sub-motor 31.

Referring to FIG. 6, the sub-driving gear 311 and the sub-driven gear 32 are rotated by a forward operation of the sub-motor 31, and the key lever 70 is moved upward by the clockwise rotation of the sub-driven gear 32.

In this case, the master lock link 33 is released from the key lever 70 and rotated clockwise by the elastic force of the pressing spring 34, such that a ready-to-release-door-lock state is made in which the hook 331 of the master lock link 33 is caught by the seating protrusion 131 of the pawl release lever 13 (e.g., the seating protrusion positioned at the radial outer side).

Referring to FIG. 7, when an occupant in the vehicle interior pulls the inside handle 49 to open the door 200 in the ready-to-release-door-lock state, the inside emergency operating lever 40 connected to the inside handle 49 is rotated (e.g., counterclockwise) by the inside handle wire 41.

In this case, a rotation guide flange 332 having an arc shape is formed on the master lock link 33 and corresponds to the pressing flange 42 of the inside emergency operating lever 40.

The pressing flange 42 pushes the rotation guide flange 332 of the master lock link 33 while being rotated integrally with the rotation of the inside emergency operating lever 40. In this case, in the ready-to-release-door-lock state in which the master lock link 33 is caught by the seating protrusion 131 of the pawl release lever 13, the master lock link 33 moves downward in a predetermined section on the first long hole 52 of the outside emergency operating lever 50 and further rotates clockwise, thereby rotating the pawl release lever 13 counterclockwise.

In this case, the pawl 12 is rotated together with the pawl release lever 13 by the rotation of the pawl release lever 13 and deviates from the rotation trajectory of the catch 11. Therefore, the catch 11 may rotate freely, such that the door 200 locked to the vehicle body may be released and opened.

Referring to FIG. 8, when the user outside the vehicle pulls the outside handle 59 to open the door 200 in the ready-to-release-door-lock state (see FIG. 6), the outside emergency operating lever 50 connected to the outside handle 59 through the outside handle wire 51 rotates (e.g., clockwise).

When the outside emergency operating lever 50 rotates clockwise, the master lock link 33 in the ready-to-release-door-lock state is moved downward in a predetermined section along the first long hole 52 by the rotation of the outside emergency operating lever 50 and rotates the pawl release lever 13 counterclockwise.

In this case, the pawl 12 is rotated together with the pawl release lever 13 by the rotation of the pawl release lever 13 and deviates from the rotation trajectory of the catch 11. Therefore, the catch 11 may rotate freely, such that the door 200 locked to the vehicle body may be released and opened.

Figure 9:
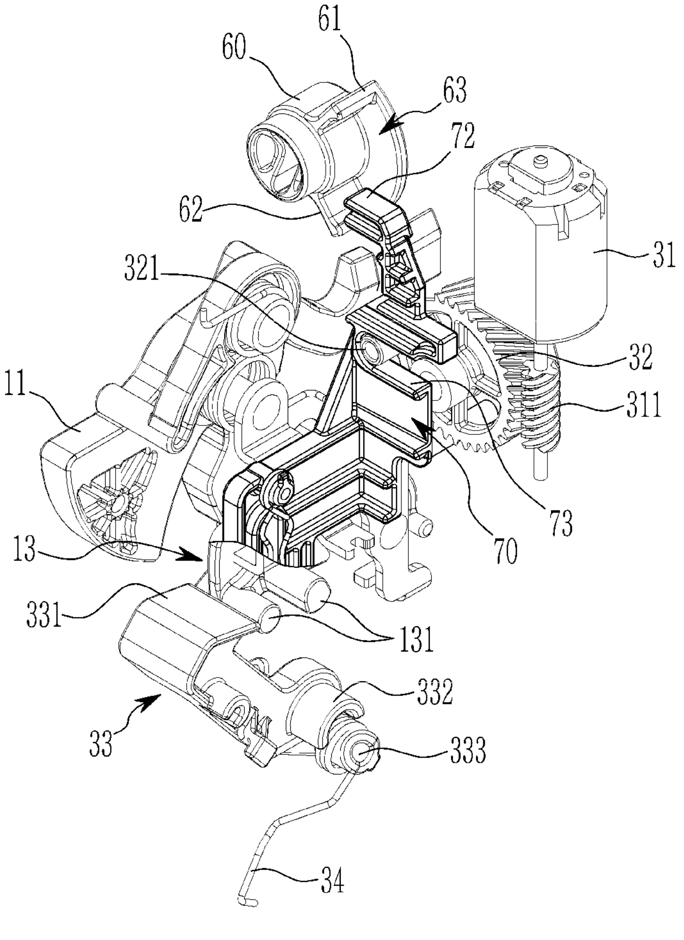
FIGS. 9 and 10 are views for explaining an operation using a vehicle master key when the electric door latch apparatus for a vehicle according to an embodiment of the present invention is discharged.
Figure 10:
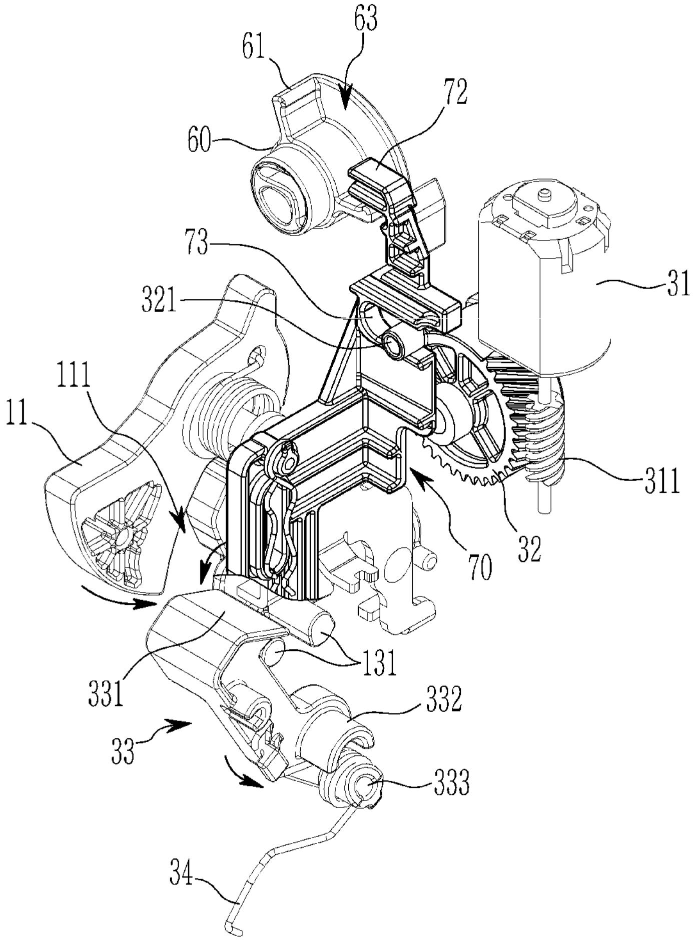

FIGS. 9 and 10 are views for explaining an operation using a vehicle master key when the electric door latch apparatus for a vehicle according to an embodiment of the present invention is discharged. For the convenience of description, FIGS. 9 and 10 illustrate a state in which a part of the key lever 70 is cut.

FIGS. 9 and 10 are views for explaining a process of opening the door by using a vehicle key when both the main motor and the sub-motor cannot operate.

The door 200 of the vehicle needs to be opened even in the case in which the vehicle battery is discharged and both the main motor 21 and the sub-motor 31 cannot operate.

Referring to FIG. 9, when the user outside the vehicle inserts a master key into a keyhole (not illustrated) and rotates the master key to open the door 200 by using a master key, the key nut 60 connected to the keyhole rotates counterclockwise, and the key lever 70 is moved upward by the rotation of the key nut 60.

Specifically, when the key nut 60 rotates counterclockwise, the second operating protrusion 62 of the key nut 60 pushes up the catching end 72 of the key lever 70, such that the key lever 70 moves upward.

Referring to FIG. 10, the master lock link 33 is rotated clockwise by the elastic force of the pressing spring 34 while being released from the key lever 70, and the ready-to-release-door-lock state is made in which the hook 331 of the master lock link 33 is caught by the seating protrusion 131 of the pawl release lever 13.

When the user pulls the outside handle 59 in the ready-to-release-door-lock state, the outside emergency operating lever 50 may rotate, such that the door 200 may be opened, as illustrated in FIG. 8.

Figure 11:
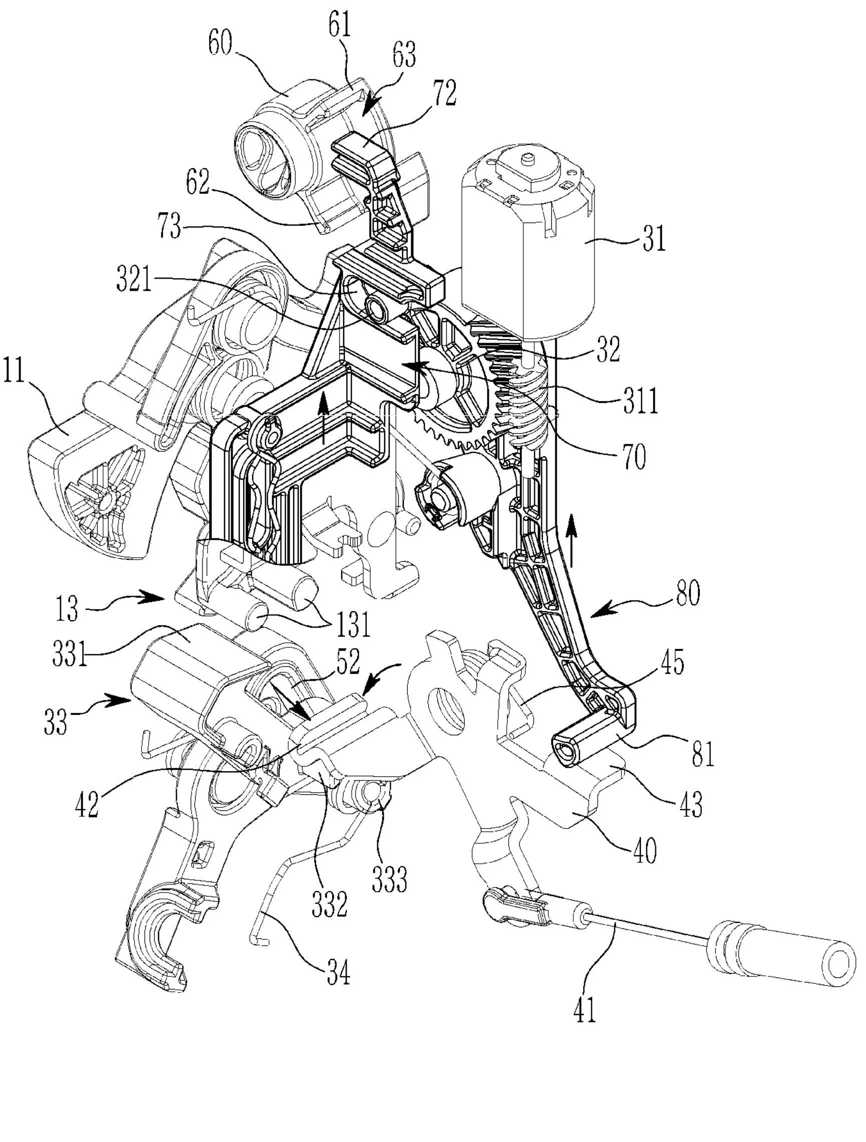
FIGS. 11 to 13 are views for explaining an operation of using an inside handle when the electric door latch apparatus for a vehicle according to an embodiment of the present invention is discharged.
Figure 12:
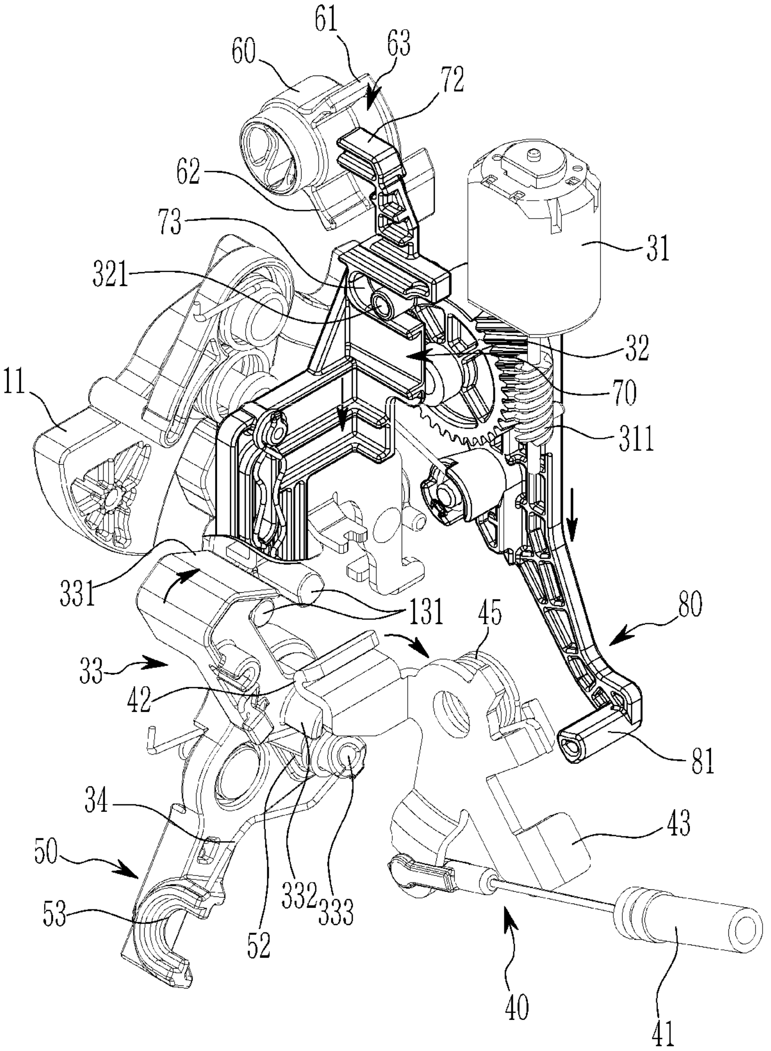
Figure 13:
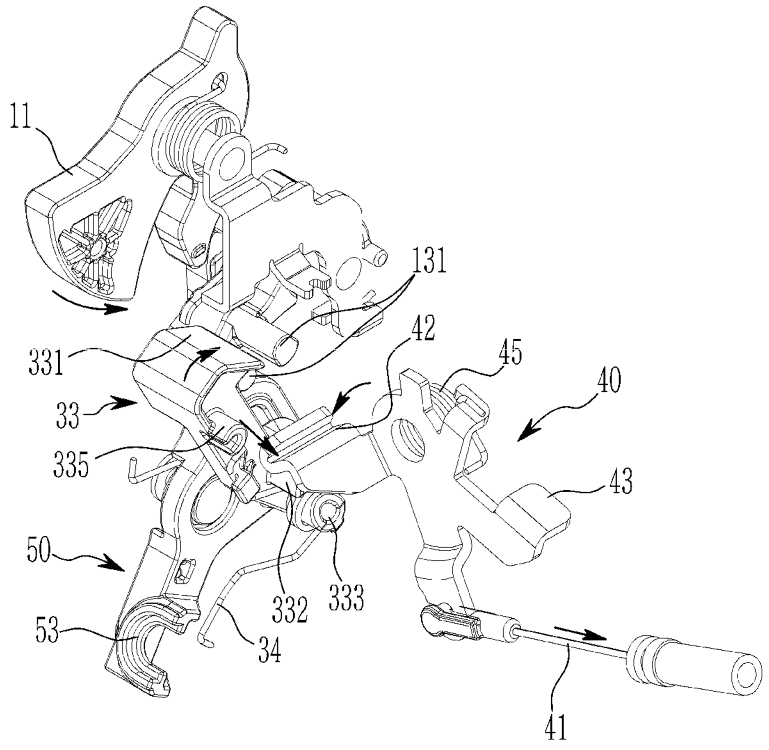

FIGS. 11 to 13 are views for explaining an operation of using an inside handle when the electric door latch apparatus for a vehicle according to an embodiment of the present invention is discharged. For the convenience of description, FIGS. 11 and 12 illustrate a state in which a part of the key lever 70 is cut.

Even though both the main motor 21 and the sub-motor 31 cannot operate, the user needs to release the door 200 locked to the vehicle by manipulating the key nut 60 by using the vehicle key from the outside of the vehicle, and the occupant inside the vehicle also needs to open the door 200.

To this end, the pressing flange 42 is provided at one end of the inside emergency operating lever 40, and the push flange 43 is formed integrally with the other end thereof and configured to push the manual emergency door unlocking part 80.

For example, the pressing flange 42 may be provided forward of the push flange 43 at a predetermined angle based on the rotation direction of the inside emergency operating lever 40.

Therefore, when both the main motor 21 and the sub-motor 31 cannot operate, the occupant in the vehicle interior may pull the inside handle 49 once to manually open the door 200 (primary motion). Then, as illustrated in FIG. 11, the inside emergency operating lever 40 connected to the inside handle 49 rotates about the rotary shaft thereof. In this case, when the manual emergency door unlocking part 80 moves upward, the key lever 70 connected to the manual emergency door unlocking part 80 also moves upward.

In other words, when the inside emergency operating lever 40 is rotated counterclockwise (based on FIG. 11) by the operation of the inside handle 49, the push flange 43 of the inside emergency operating lever 40 pushes up the first connection protrusion 81 of the manual emergency door unlocking part 80. Further, the emergency protrusion 79 of the key lever 70 inserted into the main slot 85 of the manual emergency door unlocking part 80 receives the elastic force (or compressive force), such that the key lever 70 moves upward.

As the key lever 70 moves upward, the master lock link 33 selectively connected to the lower end of the key lever 70 is released from the key lever 70 and rotated clockwise by the elastic force of the pressing spring 34, and the ready-to-release-door-lock state is made in which the hook 331 of the master lock link 33 is caught by the seating protrusion 131 of the pawl release lever 13 (the seating protrusion disposed at the radial outer side).

In this state, when the occupant releases the inside handle 49, the inside emergency operating lever 40 is returned to the original position by the elastic force of the return spring 45, as illustrated in FIG. 12. However, the manual emergency door unlocking part 80 and the key lever 70 are kept moved upward. Further, the ready-to-release-door-lock state is maintained, in which the hook 331 of the master lock link 33 is caught by the seating protrusion 131 of the pawl release lever 13.

In the ready-to-release-door-lock state, the occupant may manipulate the inside handle 29 installed on the door 200 once more to open the door 200 (secondary motion). Then, as illustrated in FIG. 13, in the ready-to-release-door-lock state, the inside emergency operating lever 40 rotates counterclockwise again. Further, the pressing flange 42 is rotated by the rotation of the inside emergency operating lever 40 and pushes the rotation guide flange 332 of the master lock link 33.

In this case, in the ready-to-release-door-lock state in which the master lock link 33 is caught by the seating protrusion 131 of the pawl release lever 13, the master lock link 33 rotates the pawl release lever 13 counterclockwise while moving downward along the first long hole 52 in the predetermined section.

Therefore, the pawl 12 is rotated together with the pawl release lever 13 by the rotation of the pawl release lever 13.

Therefore, the pawl 12 deviates from the trajectory of the catch 11. Therefore, the catch 11 may rotate freely, such that the door 200 locked to the vehicle body may be released and opened.

Meanwhile, the door 200 need not be opened from the vehicle interior while the vehicle travels. That is, when the child-lock switch 92 is turned on, a child-lock function is activated such that the door 200 cannot be opened by the occupant in the vehicle interior, but the door 200 may be opened from the outside of the vehicle.

Figure 14:
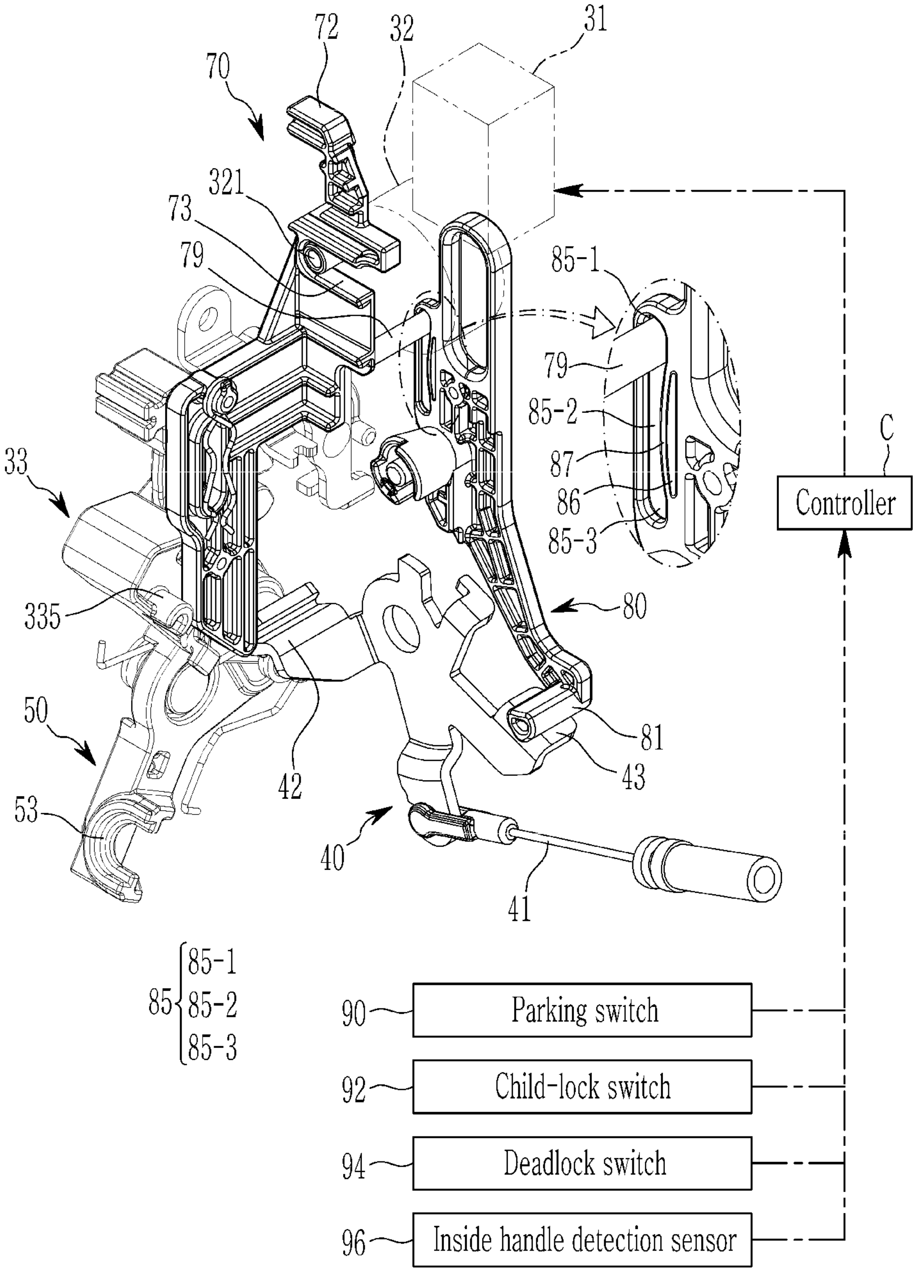
FIGS. 14 to 17 are views for explaining operations of a child-lock function and a deadlock function of the electric door latch apparatus for a vehicle according to an embodiment of the present invention.

FIG. 14 is a view for explaining operations of the child-lock function and the deadlock function of the electric door latch apparatus for a vehicle according to an embodiment of the present invention.

Referring to FIG. 14, in an embodiment of the present invention, the child-lock function, which is applied only to the rear seat of the vehicle, may be performed.

That is, the child-lock function serves to prevent the door 200 corresponding to the rear seat of the vehicle from being opened when the child-lock switch 92 is in an ON state. In an embodiment of the present invention, the child-lock function may operate as follows.

When the child-lock switch 92 is turned on and the inside handle detection sensor 96 detects the motion of the inside handle 49, the controller C operates the sub-motor 31 in the reverse direction and moves the key lever 70 downward, such that the rotation of the master lock link 33 is restricted by the key lever 70. Therefore, the child-lock function is implemented.

Hereinafter, a process in which the occupant manipulates the inside handle 49 to open the door in the state in which the child-lock switch 92 is turned on will be described.

As illustrated in FIG. 14, in the initial state, the key lever 70 is positioned at the lower side, and the manual emergency door unlocking part 80 is also positioned at the lower side. In this case, the emergency protrusion 79 of the key lever 70 is inserted into the upper region 85-1 of the main slot 85 of the manual emergency door unlocking part 80.

When the occupant in the rear seat manipulates the inside handle 49 to open the door 200 when the child-lock switch 92 is in the on state, the inside emergency operating lever 40 connected to the inside handle 49 moves the manual emergency door unlocking part 80 upward or downward while rotating about the rotary shaft thereof.

In this case, when the manual emergency door unlocking part 80 moves upward, the key lever 70 connected to the manual emergency door unlocking part 80 also moves upward.

Figure 15:
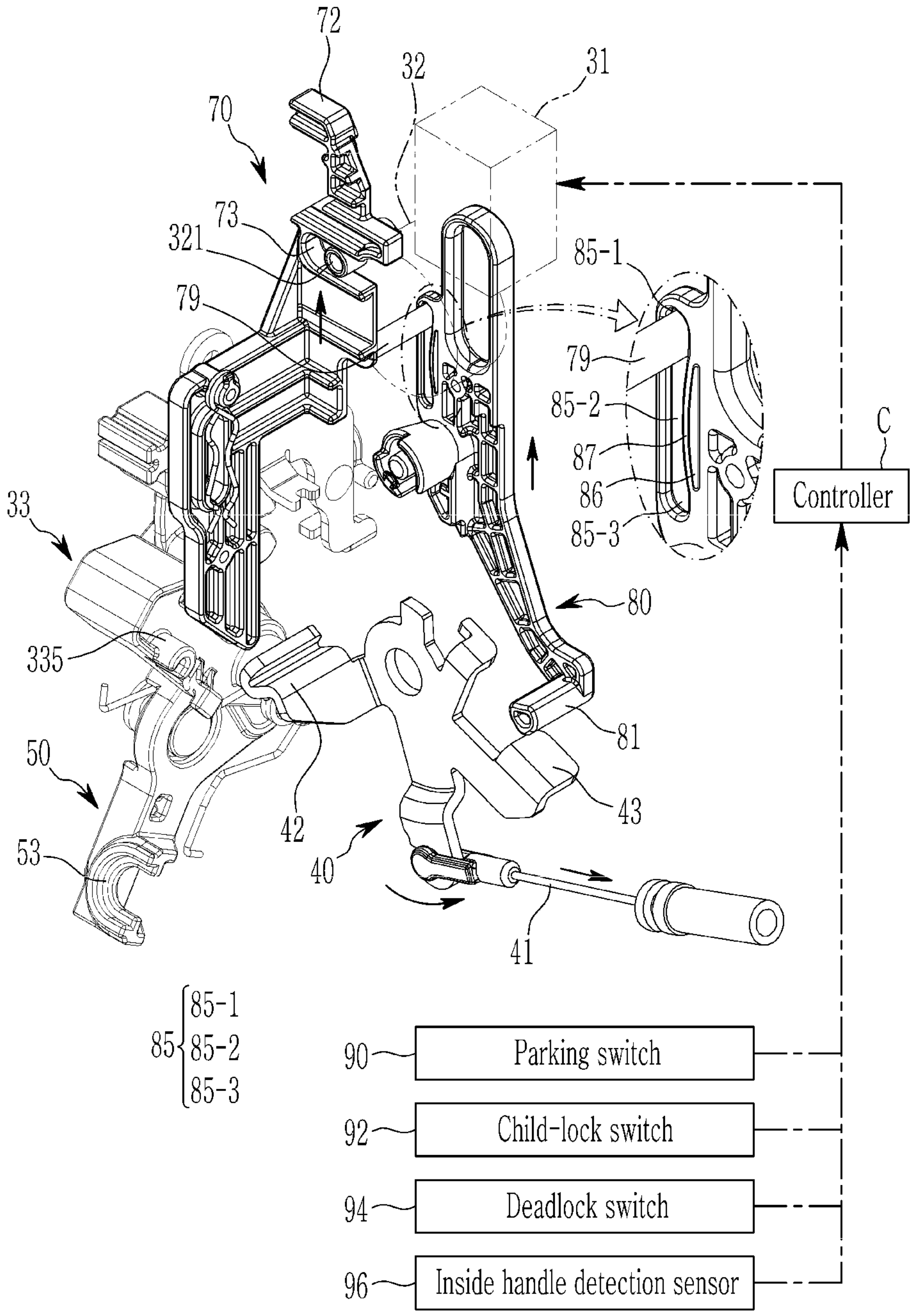

Specifically, when the inside emergency operating lever 40 is rotated counterclockwise (see FIG. 15) by the operation of the inside handle 49, the push flange 43 of the inside emergency operating lever 40 pushes up the first connection protrusion 81 of the manual emergency door unlocking part 80. When the manual emergency door unlocking part 80 moves upward, the emergency protrusion 79 of the key lever 70 inserted into the upper region 85-1 of the main slot 85 of the manual emergency door unlocking part 80 receives the elastic force (or compressive force) applied by the rib 87 of the central region 85-3, such that the key lever 70 moves upward. When the manual emergency door unlocking part 80 is completely moved upward, the emergency protrusion 79 of the key lever 70 is kept positioned at the upper region 85-1 of the main slot 85.

Figure 16:
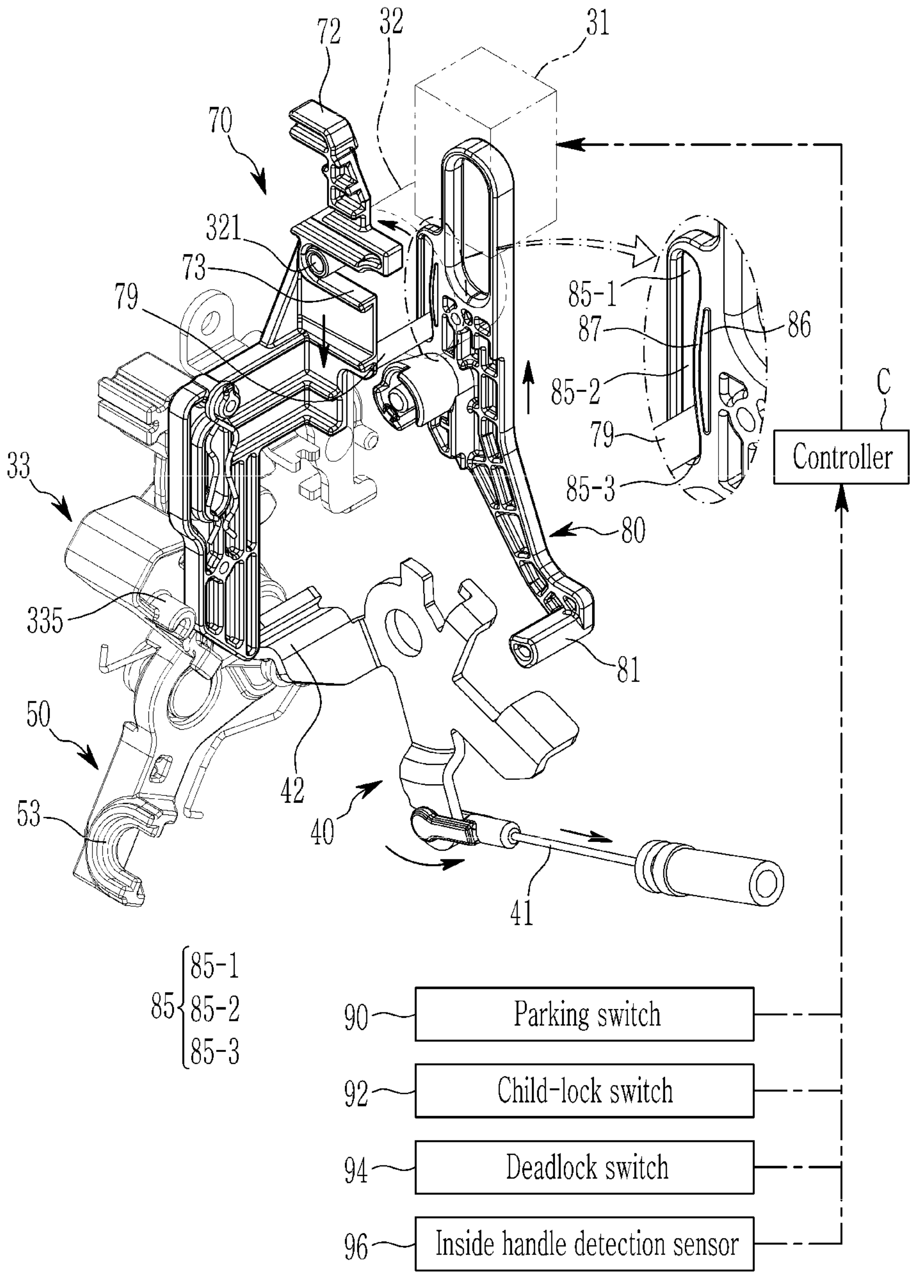

Referring to FIG. 16, in this case, when the controller C detects the ON state of the child-lock switch 92 and operates the sub-motor 31 in the reverse direction, the sub-driven gear 32 rotates counterclockwise.

Then, the key lever 70 is moved downward by the rotary protrusion 321 of the sub-driven gear 32 caught by the position regulating groove 73 of the key lever 70. When the key lever 70 is moved downward by the rotational force of the sub-motor 31, the emergency protrusion 79 of the key lever 70 receives the elastic force (or compressive force) applied by the rib 87 of the central region 85-3 of the main slot 85. However, the key lever 70 is moved downward by the rotational force of the sub-motor 31 that is higher than the elastic force (or compressive force) of the rib 87.

When the key lever 70 is positioned at the lower side, a front surface of the first portion 70-1 of the key lever 70 comes into contact with the stop protrusion 335 of the master lock link 33. Therefore, the master lock link 33 cannot be rotated by the key lever 70.

Therefore, the rear seat door 200 cannot reach the ready-to-release-door-lock state but is kept locked to the vehicle body 100. That is, the child-lock function of preventing the rear seat door 200 from being opened is implemented.

Figure 17:
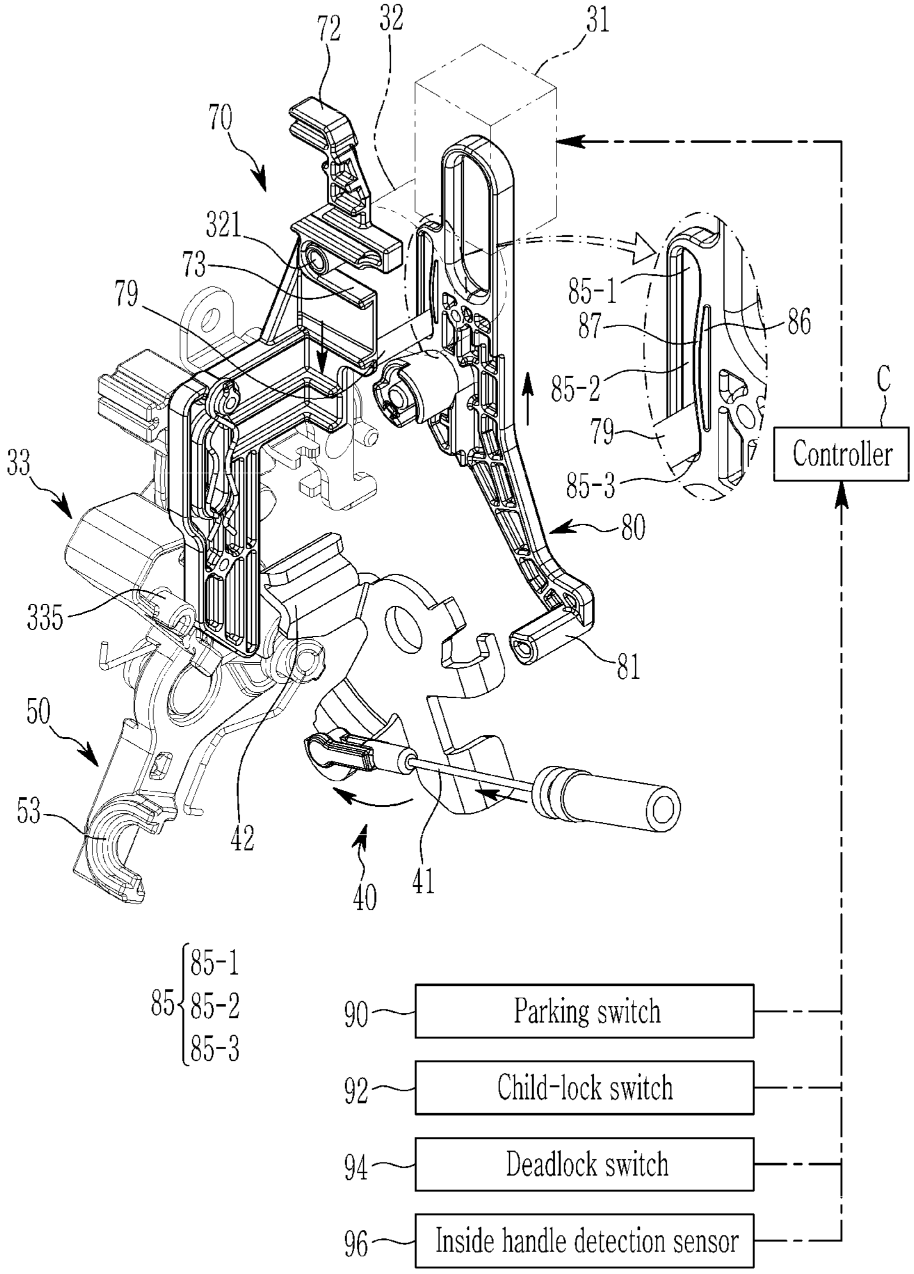

Next, referring to FIG. 17, even though the occupant in the rear seat releases the inside handle 49, the manual emergency door unlocking part 80 is kept moved upward, and the key lever 70 is kept moved downward.

When the occupant in the rear seat manipulates the inside handle 49 again to open the rear seat door 200, the emergency operating lever 40 rotates counterclockwise, such that the pressing flange 42 of the emergency operating lever 40 pushes the rotation guide flange 332 of the master lock link 33.

However, the rotation of the master lock link 33 is restricted by the key lever 70. Therefore, the pawl 12 and the pawl release lever 13 cannot rotate, and the catch 11 cannot rotate. Therefore, the door 200 is kept locked to the vehicle body 100, and the child-lock function of preventing the rear seat door 200 from being opened is implemented.

The sub-motor 31 need not be repeatedly operated when the child-lock function is performed as described above, which makes it possible to prevent an overload of the sub-motor 31.

Meanwhile, to prevent vehicle theft, a driver may perform a deadlock function of turning on the deadlock switch 94 and preventing the door 200 of the vehicle from being opened in the event of vehicle theft. The deadlock function may be performed as follows.

The deadlock switch 94 is turned on, the parking switch 90 is turned on, and the inside handle detection sensor 96 detects the motion of the inside handle. Then, the controller operates the sub-motor 31 in the reverse direction and moves the key lever 70 downward.

Hereinafter, a process in which the inside handle 49 is manipulated in the ON state of the deadlock switch 94 when the vehicle is parked will be described.

There may be a situation in which a vehicle thief breaks the glass of the vehicle, enters the vehicle interior, and manipulates the inside handle 49 to open the door 200 in the state in which the driver has turned on the deadlock switch 94 after parking the vehicle. In this case, the controller C detects the parked state of the vehicle by means of the parking switch 90, recognizes the state in which the deadlock switch 94 is activated, and detects the upward or downward movement of the manual emergency door unlocking part 80 made by operating the inside handle 49. Therefore, the controller C operates the sub-motor 31 in the reverse direction and moves the key lever 70 downward.

Therefore, similar to the child-lock situation, even though the inside emergency operating lever 40 is operated by the operation of the inside handle 49, the key lever 70 is moved downward by the operation of the sub-motor 31, such that the door cannot reach the ready-to-release-door-lock state, and the door 200 of the vehicle cannot be opened.

According to the electric emergency door latch apparatus for a vehicle according to an embodiment of the present invention described above, when the occupant manipulates the inside handle while the child-lock function or the deadlock function is activated, the key lever is moved downward by the sub-motor, such that the rotation of the master lock link is kept restricted. Therefore, even though the occupant repeatedly manipulates the inside handle, the sub-motor does not repeatedly operate, which makes it possible to prevent an overload of the sub-motor.

While the embodiments of the present invention have been described above, the present invention is not limited thereto, and various modifications can be made and carried out within the scope of the claims, the detailed description of the invention, and the accompanying drawings, and also fall within the scope of the invention.

What is claimed is:

1. An electric door latch apparatus for a vehicle, the electric door latch apparatus comprising:
- a catch part configured to lock a door to a vehicle body by being caught by a striker mounted on the vehicle body or to selectively unlock the door from the vehicle body by being separated from the striker;
- a door locking/unlocking part configured to unlock or lock the catch part to the striker by applying a rotational force of a main motor to the catch part;
- a master lock link configured to selectively rotate the catch part;
- a key lever configured to selectively restrict a rotation of the master lock link;
- an inside emergency operating lever configured to be rotated by an inside handle and to selectively rotate the master lock link;
- a manual emergency door unlocking part configured to be moved by a rotation of the inside emergency operating lever and to selectively provide an elastic force to the key lever; and
- an electric emergency door unlocking part configured to selectively move the key lever.

2. The electric door latch apparatus of claim 1, wherein the catch part comprises:
- a catch having a locking groove provided so that the striker is inserted into the locking groove or the striker is separated from the locking groove;
- a pawl rotatably provided in a state of being in close contact with the catch and configured to restrict a rotation of the catch or to be separated from the catch to allow the catch to rotate freely; and a pawl release lever configured to rotate integrally with the pawl.

3. The electric door latch apparatus of claim 2, wherein a hook formed on the master lock link is configured to be selectively caught by a seating protrusion formed on the pawl release lever, such that the catch part is selectively rotated.

4. The electric door latch apparatus of claim 1, further comprising a pressing flange provided on the inside emergency operating lever and configured to selectively press a rotation guide flange provided on the master lock link by a rotation of the inside emergency operating lever.

5. The electric door latch apparatus of claim 1, further comprising a push flange provided on the inside emergency operating lever and configured to push up a first connection protrusion provided on the manual emergency door unlocking part by a rotation of the inside emergency operating lever, such that the key lever moves.

6. The electric door latch apparatus of claim 1, wherein:

an emergency protrusion is provided on the key lever;

a main slot is provided in the manual emergency door unlocking part;

an auxiliary slot is provided adjacent to the main slot of the manual emergency door unlocking part; and the emergency protrusion is inserted into the main slot to apply an elastic force to the key lever.

7. The electric door latch apparatus of claim 6, wherein the main slot comprises:

upper and lower regions each having a relatively large width; and a central region disposed between the upper region and the lower region and having a width smaller than the width of the upper region and the width of the lower region.

8. The electric door latch apparatus of claim 7, further comprising a rib provided between the central region and the auxiliary slot and configured to apply an elastic force to the emergency protrusion of the key lever.

9. The electric door latch apparatus of claim 1, wherein the electric emergency door unlocking part comprises:

a sub-motor;

a sub-driving gear provided on a rotary shaft of the sub-motor;

a sub-driven gear configured to engage with the sub-driving gear; and a rotary protrusion provided on the sub-driven gear and inserted into a position regulating groove provided in the key lever.

10. The electric door latch apparatus of claim 9, further comprising:

a child-lock switch provided in the vehicle;

an inside handle detection sensor configured to detect a motion of the inside handle; and a controller configured to operate the sub-motor and move the key lever when the child-lock switch is turned on and the inside handle detection sensor detects the motion of the inside handle.

11. The electric door latch apparatus of claim 9, further comprising:

a parking switch provided in the vehicle;

a deadlock switch provided in the vehicle;

an inside handle detection sensor configured to detect a motion of the inside handle; and a controller configured to operate the sub-motor and move the key lever when the parking switch and the deadlock switch are turned on and the inside handle detection sensor detects the motion of the inside handle.

12. The electric door latch apparatus of claim 1, further comprising a key nut configured to move the key lever by being rotated by a vehicle key.

13. The electric door latch apparatus of claim 12, further comprising first and second operating protrusions provided on the key nut and selectively connected to a catching end provided on the key lever.

14. The electric door latch apparatus of claim 1, further comprising an outside emergency operating lever configured to be rotated by an operating force of an outside handle and to apply a rotational force to the catch part through the electric emergency door unlocking part.

15. The electric door latch apparatus of claim 14, wherein:

a first long hole is provided in the outside emergency operating lever;

a pin shaft is provided on the master lock link; and the pin shaft is configured to be movably inserted into the first long hole.

16. An electric door latch apparatus for a vehicle, the electric door latch apparatus comprising:

a catch part configured to lock a door to a vehicle body by being caught by a striker mounted on the vehicle body or to selectively unlock the door from the vehicle body by being separated from the striker, wherein the catch part comprises:

a catch having a locking groove provided so that the striker is inserted into the locking groove or the striker is separated from the locking groove;

a pawl rotatably provided in a state of being in close contact with the catch and configured to restrict a rotation of the catch or to be separated from the catch to allow the catch to rotate freely; and a pawl release lever configured to rotate integrally with the pawl;

a door locking/unlocking part configured to unlock or lock the catch part to the striker by applying a rotational force of a main motor to the catch part, wherein the door locking/unlocking part comprises:

the main motor;

a rotary shaft provided on the main motor and configured to rotate in two directions;

a main driving gear provided on the rotary shaft;

a main driven gear configured to engage with the main driving gear; and a main operating lever configured to engage with the main driven gear and transmit a rotational force of the main motor to the pawl release lever through the main driven gear;

a master lock link configured to selectively rotate the catch part;

a key lever configured to selectively restrict a rotation of the master lock link;

an inside emergency operating lever configured to be rotated by an inside handle and to selectively rotate the master lock link;

a manual emergency door unlocking part configured to be moved by a rotation of the inside emergency operating lever and to selectively provide an elastic force to the key lever; and an electric emergency door unlocking part configured to selectively move the key lever.

17. The electric door latch apparatus of claim 16, wherein:

a pressing protrusion is provided on the main operating lever;

a seating protrusion corresponding to the pressing protrusion is provided on the pawl release lever; and the pressing protrusion is configured to press the seating protrusion by a rotation of the main operating lever, such that the pawl release lever rotates.

18. A vehicle comprising:

a vehicle body;

a striker mounted on the vehicle body;

a door coupled to the vehicle body;

a catch part configured to lock the door to the vehicle body by being caught by the striker or to selectively unlock the door from the vehicle body by being separated from the striker, wherein the catch part comprises a catch, a pawl, and a pawl release lever;

a door locking/unlocking part configured to unlock or lock the catch part to the striker by applying a rotational force of a main motor to the catch part;

a master lock link configured to selectively rotate the catch part;

a key lever configured to selectively restrict a rotation of the master lock link;

an inside emergency operating lever configured to be rotated by an inside handle and to selectively rotate the master lock link;

a manual emergency door unlocking part configured to be moved by a rotation of the inside emergency operating lever and to selectively provide an elastic force to the key lever; and an electric emergency door unlocking part configured to selectively move the key lever, wherein the electric emergency door unlocking part comprises:

a sub-motor;

a sub-driving gear provided on a rotary shaft of the sub-motor;

a sub-driven gear configured to engage with the sub-driving gear; and a rotary protrusion provided on the sub-driven gear and inserted into a position regulating groove provided in the key lever.

19. The vehicle of claim 18, further comprising:

a child-lock switch provided in the vehicle;

an inside handle detection sensor configured to detect a motion of the inside handle; and a controller configured to operate the sub-motor and move the key lever when the child-lock switch is turned on and the inside handle detection sensor detects the motion of the inside handle.

20. The vehicle of claim 18, further comprising:

a parking switch provided in the vehicle;

a deadlock switch provided in the vehicle;

an inside handle detection sensor configured to detect a motion of the inside handle; and a controller configured to operate the sub-motor and move the key lever when the parking switch and the deadlock switch are turned on and the inside handle detection sensor detects the motion of the inside handle.

* * * * *